Nov. 1, 1960 L. V. OXLEY ET AL 2,958,567
SCORING MECHANISM FOR AUTOMOBILE RACES AND THE LIKE
Filed Aug. 13, 1956 10 Sheets-Sheet 1
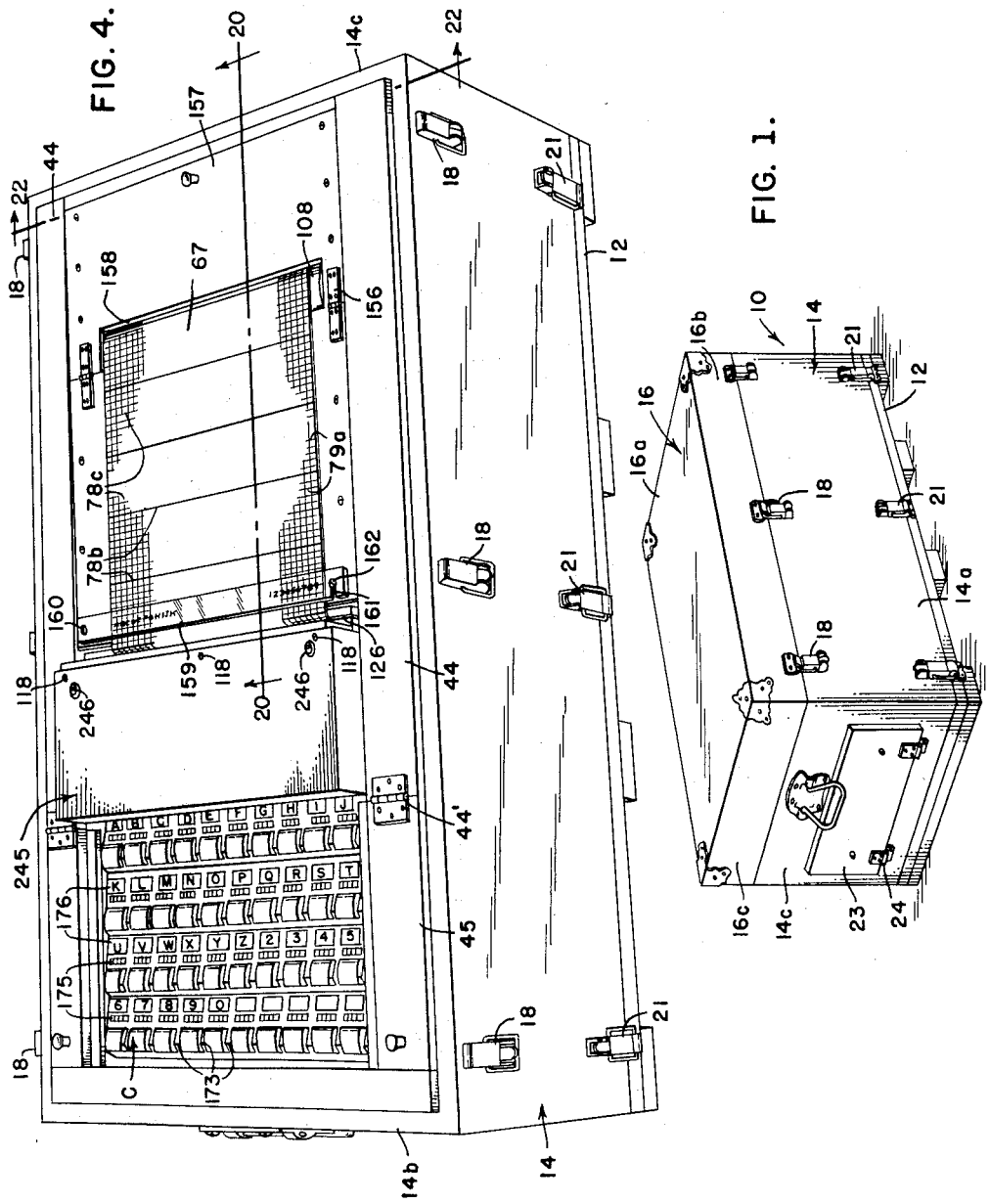
INVENTORS
Leroy V. Oxley
BY Clarence M. Blythe
Michael Popovich
ATTORNEYS

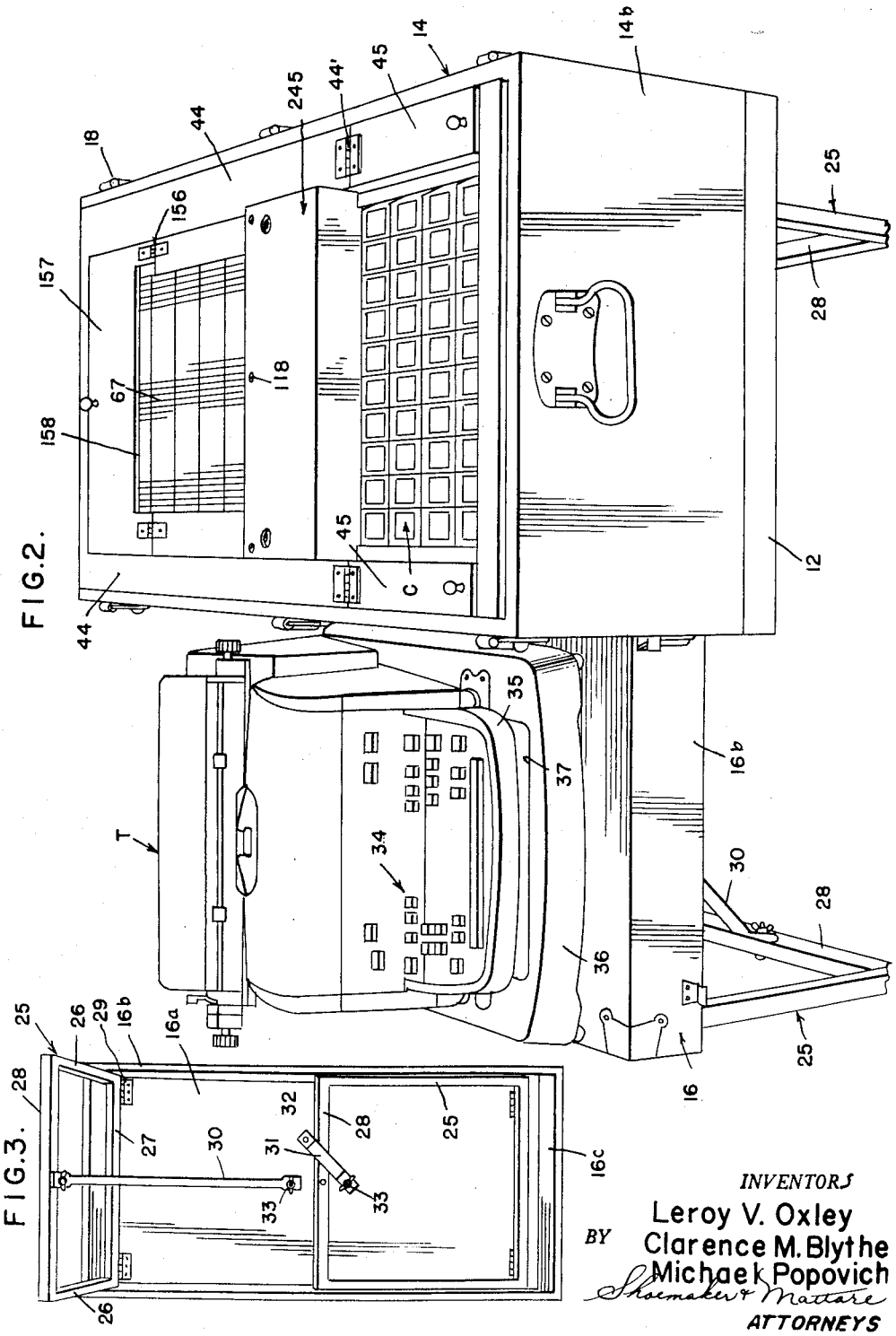

Nov. 1, 1960 L. V. OXLEY ET AL 2,958,567
SCORING MECHANISM FOR AUTOMOBILE RACES AND THE LIKE
Filed Aug. 13, 1956 10 Sheets-Sheet 3

INVENTORS
Leroy V. Oxley
BY Clarence M. Blythe
Michael Popovich
ATTORNEYS

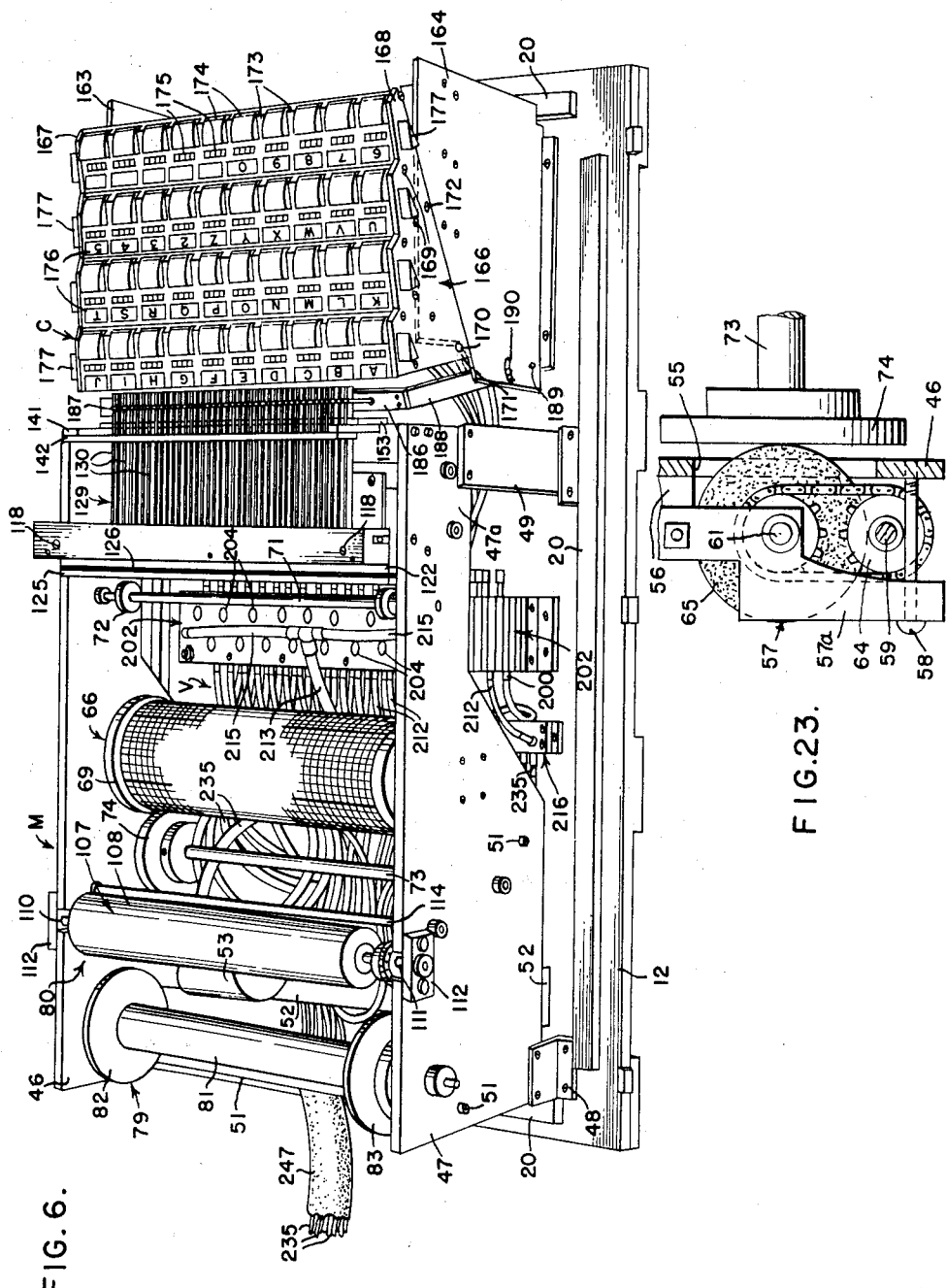

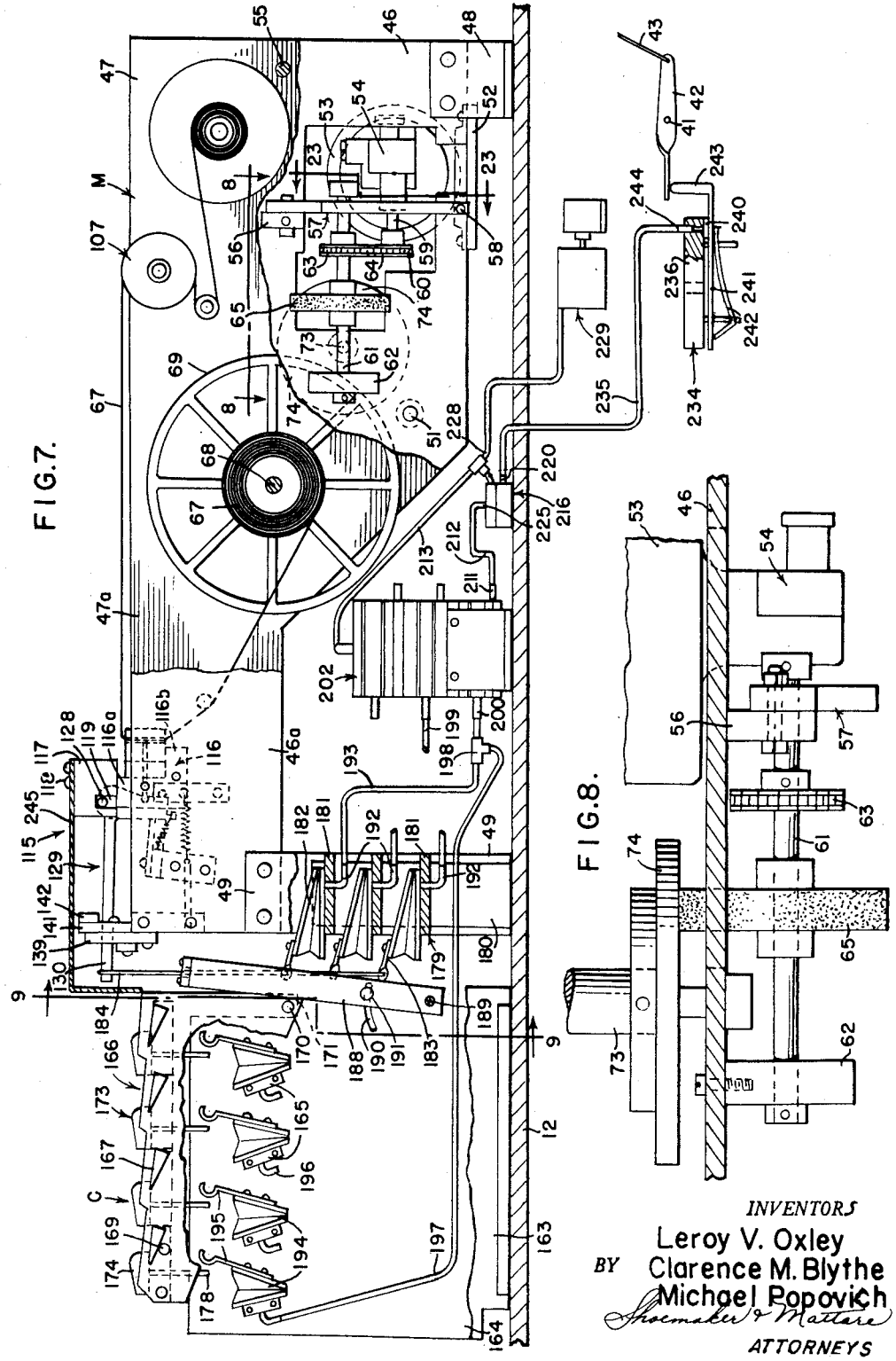

Nov. 1, 1960 L. V. OXLEY ET AL 2,958,567
SCORING MECHANISM FOR AUTOMOBILE RACES AND THE LIKE
Filed Aug. 13, 1956 10 Sheets-Sheet 6

INVENTORS
Leroy V. Oxley
BY Clarence M. Blythe
Michael Popovich
Shoemaker + Mattare
ATTORNEYS Nov. 1, 1960     L. V. OXLEY ET AL     2,958,567
SCORING MECHANISM FOR AUTOMOBILE RACES AND THE LIKE
Filed Aug. 13, 1956     10 Sheets-Sheet 7
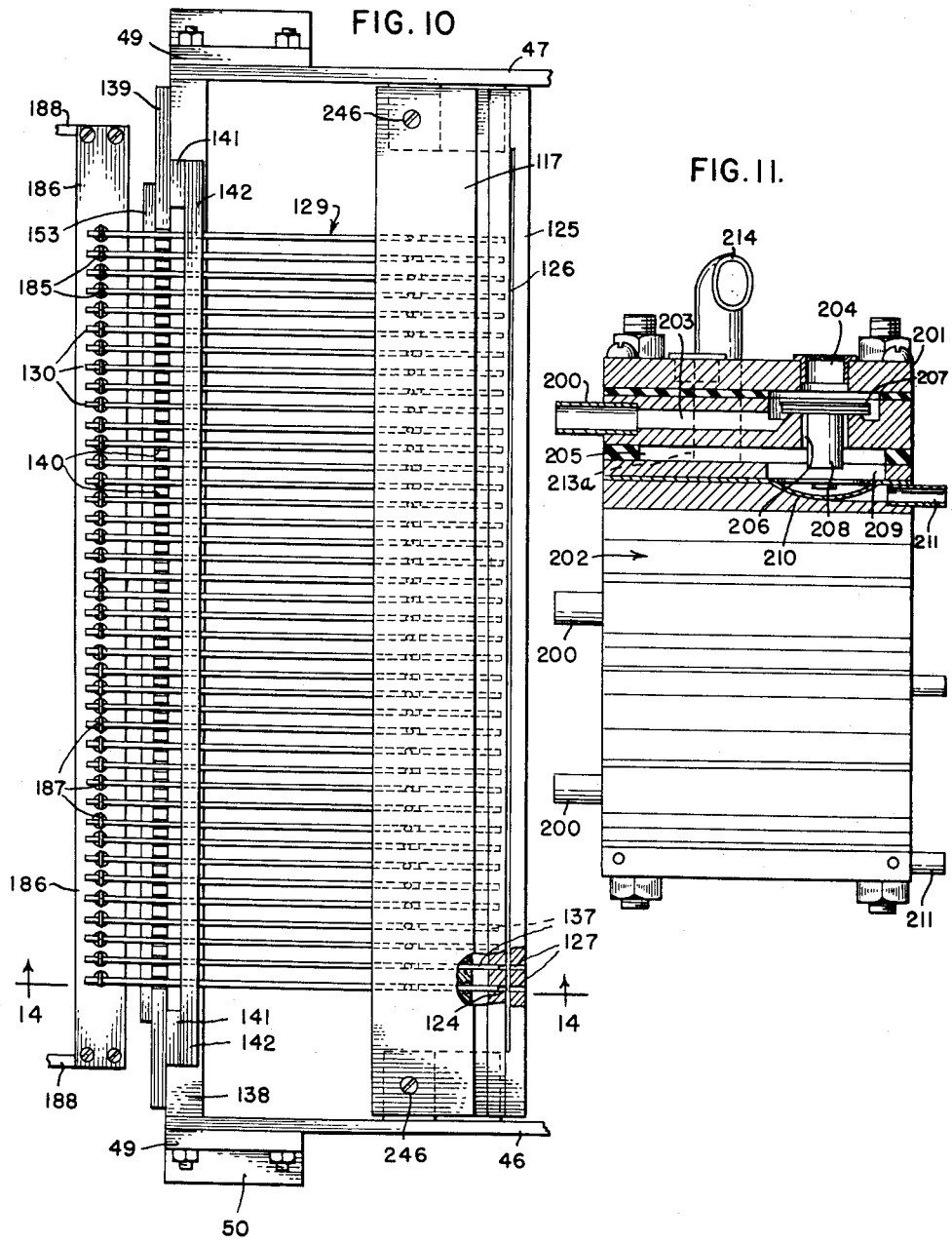
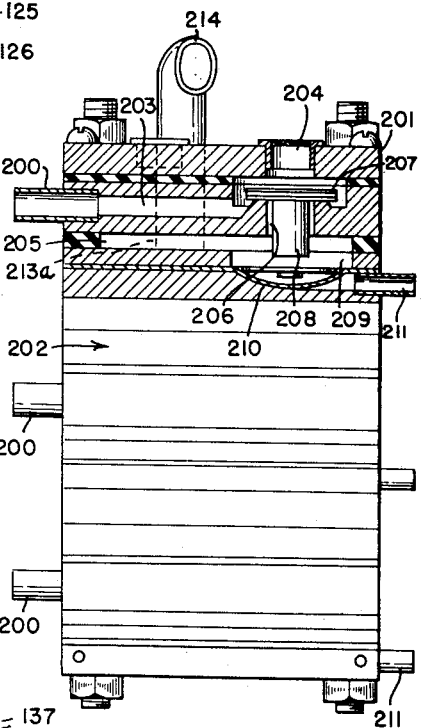
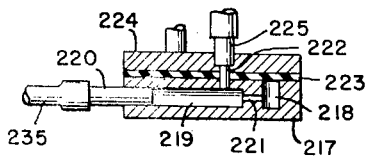
INVENTORS
Leroy V. Oxley
BY Clarence M. Blythe
Michael Popovich
Shoemaker & Mattare
ATTORNEYS Nov. 1, 1960

L. V. OXLEY ET AL 2,958,567

SCORING MECHANISM FOR AUTOMOBILE RACES AND THE LIKE

Filed Aug. 13, 1956

INVENTORS
Leroy V. Oxley
Clarence M. Blythe
Michael Popovich
BY Shoemaker & Mattare
ATTORNEYS Nov. 1, 1960   L. V. OXLEY ET AL   2,958,567
SCORING MECHANISM FOR AUTOMOBILE RACES AND THE LIKE
Filed Aug. 13, 1956   10 Sheets-Sheet 9
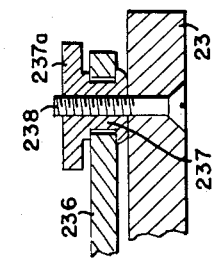
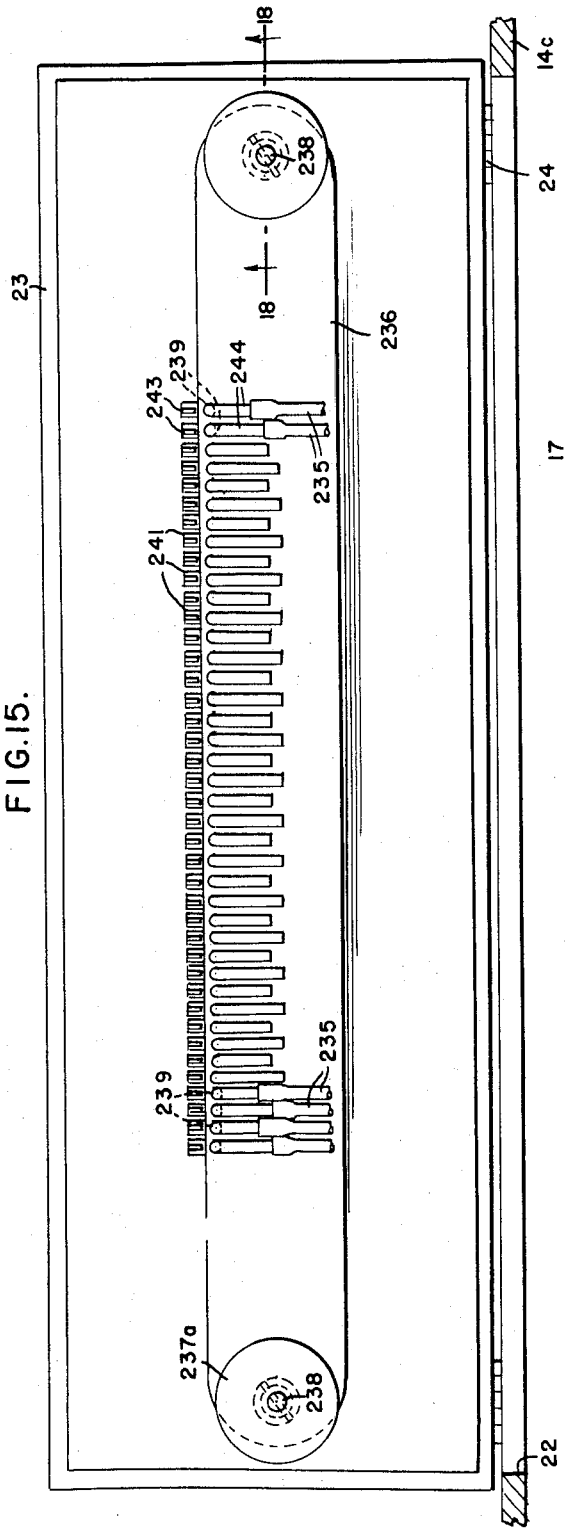
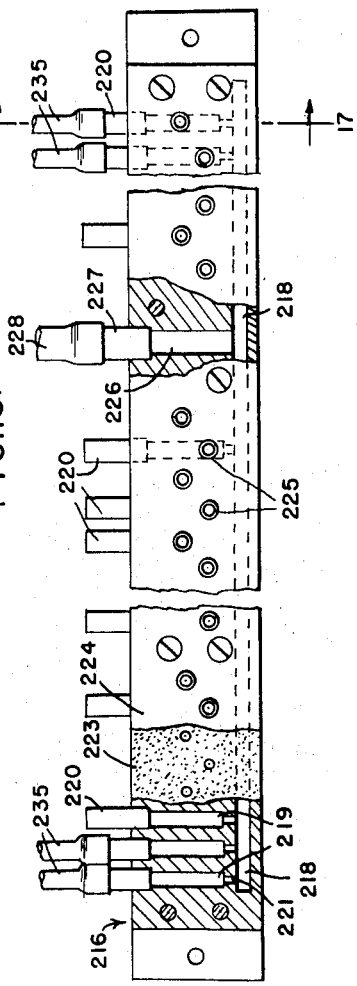
INVENTORS
Leroy V. Oxley
BY Clarence M. Blythe
Michael Popovich
Shoemaker & Mattare
ATTORNEYS Nov. 1, 1960 L. V. OXLEY ET AL 2,958,567
SCORING MECHANISM FOR AUTOMOBILE RACES AND THE LIKE
Filed Aug. 13, 1956 10 Sheets-Sheet 10
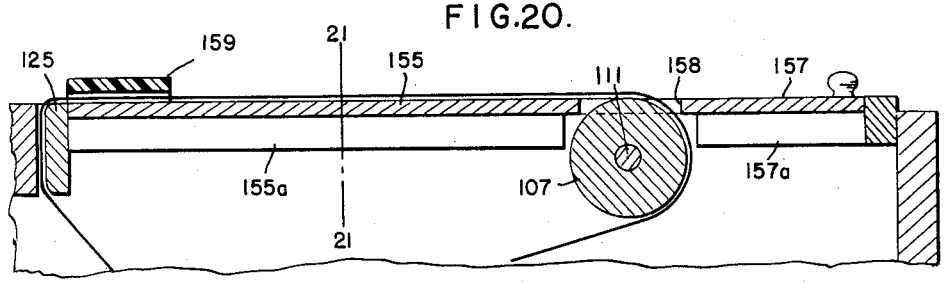
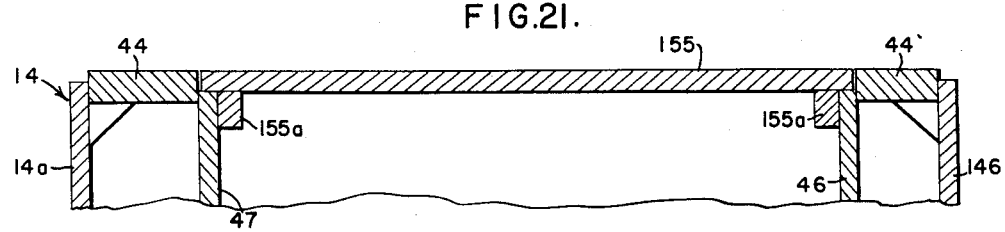
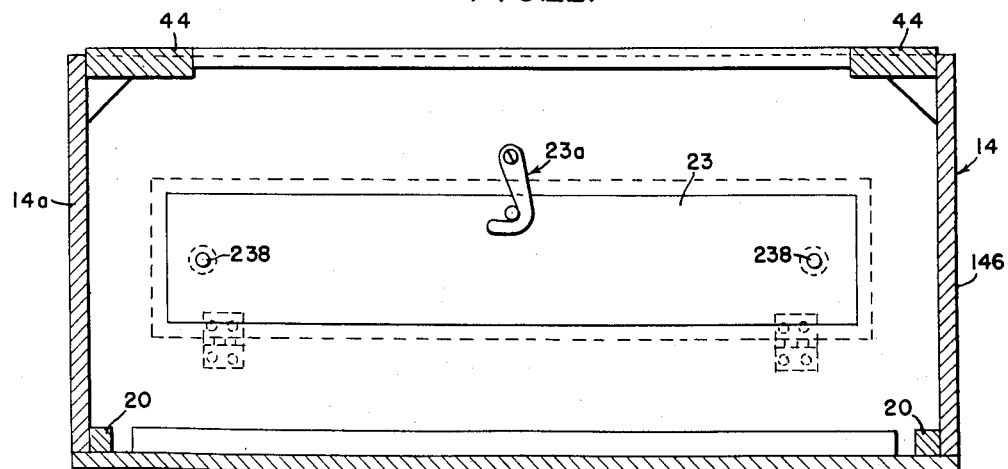
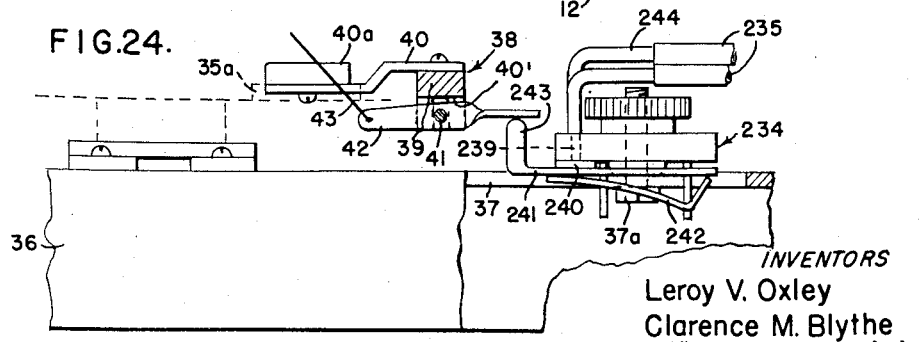
INVENTORS
Leroy V. Oxley
Clarence M. Blythe
BY Michael Popovich
Shoemaker & Mattare
ATTORNEYS United States Patent Office 2,958,567
Patented Nov. 1, 1960

2,958,567

SCORING MECHANISM FOR AUTOMOBILE RACES AND THE LIKE

Leroy V. Oxley and Clarence M. Blythe, Hendersonville, and Michael Popovich, Mountain Home, N.C., assignors to Robotyper Corporation, Hendersonville, N.C., a corporation of Michigan Filed Aug. 13, 1956, Ser. No. 603,717

14 Claims. (Cl. 346—14)

This invention relates generally to recording apparatus and is directed particularly to apparatus for scoring automobile races but is not necessarily restricted to such use.

In describing the present invention, reference will be made to the use of the same in connection with the recording or scoring of automobile races but it will be understood and readily recognized that the invention need not be restricted to such use but may be employed in other capacities where the recording of corresponding operations is desired.

In automobile racing, it is customary for the machines to make a prescribed number of circuits or laps around the race course. The vehicle which first completes the prescribed number of laps or completes the prescribed number in the shortest time is the winner. In such races obviously it is necessary that an observer be present to note the number of laps or circuits made by each vehicle and the elapsed time.

A present practice for recording a race is by the use of a time clock, an individual scorer for each car in the race and a master scorer.

One type of time clock, usually rented for use, employs numbered leaves, which leaves turn every two or three seconds and is in view of the scorers.

Each of the scorers has a score card on one side of which is a number corresponding to a number carried by the car which that scorer is to keep track of and on the other side the score card is divided into columns for noting each time the car of the scorer passes the starting line and the elapsed time. Each time the car for each scorer passes the finish line the scorer by looking at the clock sees the amount of elapsed time and marks it on the card. When each scorer's car has made ten laps the scorer holds up the card so that the master scorer can see the same and he notes the score for every ten laps.

This method of scoring is highly unsatisfactory for the reason, first, that the scorers are usually picked spectators who, if some distraction occurs such as an accident or the like, may forget to mark down a lap accomplished or the time by failing to continue to watch what is going on or the selected scorers may leave the cards or for some other reason fail to make proper notations thereon.

Another way of scoring employs time clocks each of which is operated by a checker who is assigned to a particular car of the race. This method in addition to being expensive also involves the use of a large number of persons or, in other words, requires the use of a scorer for each car in the race and in this method also errors frequently occur so that there may be uncertainty as to who has actually won the race.

In the light of the foregoing it is a particular object of the present invention to provide a new recording apparatus adapted particularly for scoring races which is designed so as not to require the services of more than two persons to score the race regardless of the number of cars involved.

Another object of the invention is to provide a new and novel recording apparatus which is so constructed and arranged that a number of duplicate records can be made simultaneously in connection with each of a number of participants in a race or other competition, by a single observer, whereby the possibility of errors being made is reduced to a minimum.

Still another object of the invention is to provide a new and novel apparatus for scoring automobile races, by means of which there may be made for each car in the race and simultaneously for each car as it crosses the finish line, a permanent record of the laps completed and the elapsed time, together with a temporary count recording of the number of times the car has completed the track circuit.

Still another object of the invention is to provide a scoring or recording apparatus of the character stated which can be efficiently operated by one or not more than two persons to make necessary records of any number of cars in a race and which makes or forms a permanent record on a moving visible tape which is readily accessible to an observer and which is moving at a known rate sufficiently slow for the observer to make thereon notations of events occuring in connection with any one of the cars in the race.

More particularly the invention has for an object to provide a motor car race recording apparatus embodying a longitudinally columnated cross-lined paper record tape which is moved over a supporting table at a constant known rate per second, in association with means for making a permanent record thereon between cross lines in a selected column corresponding to or identifying one car of a number in the race, with a keyboard controlled vacuum actuated means for operating the record making means and for simultaneously operating a visual resettable counter identifiable with the column of the tape in which the permanent record has been made.

Still another object of the invention is to provide apparatus designed particularly for recording motor vehicle races and having in association with a control keyboard having car identifying symbols on the keys, a permanent record receiving graph typed ruled tape, a means for making a combined time and lap indicating record on the tape in a car symbol identified column thereon, a visual car symbol identified counter, and mechanism set in operation by and upon the depression of each symbol carrying key for effecting the making of a record on the tape in the column identified by the car symbol of the depressed key and for actuating the counter identified by the same symbol.

A further object of the invention is to provide a mechanism of the above described character wherein the said mechanism is vacuum actuated.

Other objects and advantages of the invention will become apparent as the description of the same proceeds and the invention will be best understood from a consideration of the following detailed description taken in connection with the accompanying drawings forming a part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

Fig. 1 is a view illustrating in perspective and independently of a typewriter or other operating keyboard in association with which the apparatus is used, the casing or housing in which the apparatus, sans keyboard, is enclosed for transportation.

Fig. 2 is a perspective view illustrating the apparatus uncovered and set up for use upon a table formed of the apparatus housing top or cover with a typewriter, the keyboard of which is operatively coupled with the apparatus for the actuation of the latter.

Fig. 3 is a perspective view looking at the inside of the apparatus housing top or cover and showing supporting leg members by which the cover is converted into the supporting table of Fig. 2, one of the leg members being in folded position and the other one opened out in position of use.

Fig. 4 is a view in perspective of the apparatus of the present invention showing the same in its encasing housing with the top or cover removed and showing the record tape and counters.

Fig. 6 is a view in perspective corresponding to Fig. 5 but viewing the apparatus from the opposite side and showing the cover for the punch operating bell cranks removed.

Fig. 7 is a view in side elevation of the mechanism removed from the housing, with portions of the side plates of the units broken away and showing the air impulse lines from one valve of the impulse plate to one actuating bellows for a punch pin and the corresponding actuating bellows for a counter.

Fig. 8 is a sectional detail taken substantially on the line 8—8 of Fig. 7.

Fig. 10 is a top plan view of the punch pin actuating bell cranks showing the die plate and paper guide slot with a portion thereof broken away and sectioned.

Fig. 11 is an end elevational view of the bank of secondary valves with one valve in section showing details thereof.

Fig. 15 is a view looking at the inner side of an end wall door for the machine housing, showing the manner of securing the impulse valve unit thereto for transportation, portions of the end wall at the sides of the door opening being in section.

Fig. 16 is a view partly in top plan of the bleed unit assembly with portions of the same broken away through several parts thereof.

Fig. 17 is a sectional view taken substantially on the line 17—17 of Fig. 16.

Fig. 18 is a sectional view taken substantially on the line 18—18 of Fig. 15.

Fig. 20 is a sectional view taken substantially on the line 20—20 through the top part only of the housing parts and showing the path of the record tape.

Fig. 21 is a transverse section taken substantially on the line 21—21 of Fig. 20.

Fig. 22 is a transverse sectional view taken substantially on the line 22—22 of Fig. 4.

Fig. 23 is a sectional view taken substantially on the line 23—23 of Fig. 7.

Fig. 24 is a detail view illustrating the key harness with the impulse valve unit.

Figure 5:
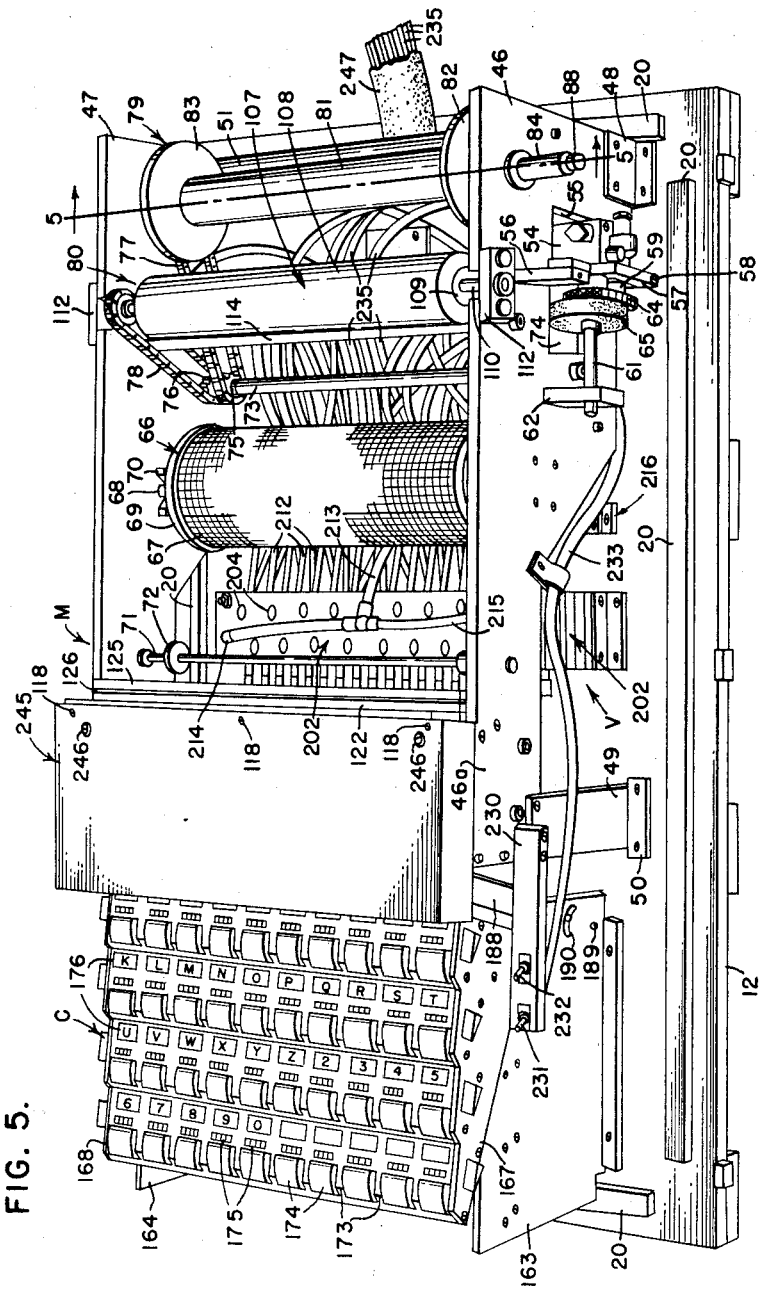
Fig. 5 is a top perspective view of the apparatus in approximately the same position as that of Fig. 4 but with the surrounding side and end walls of the housing removed, a filled paper tape roll being shown in position ready for feeding through the die guide to the feeding roll and to the take-up spool.
Figure 9:
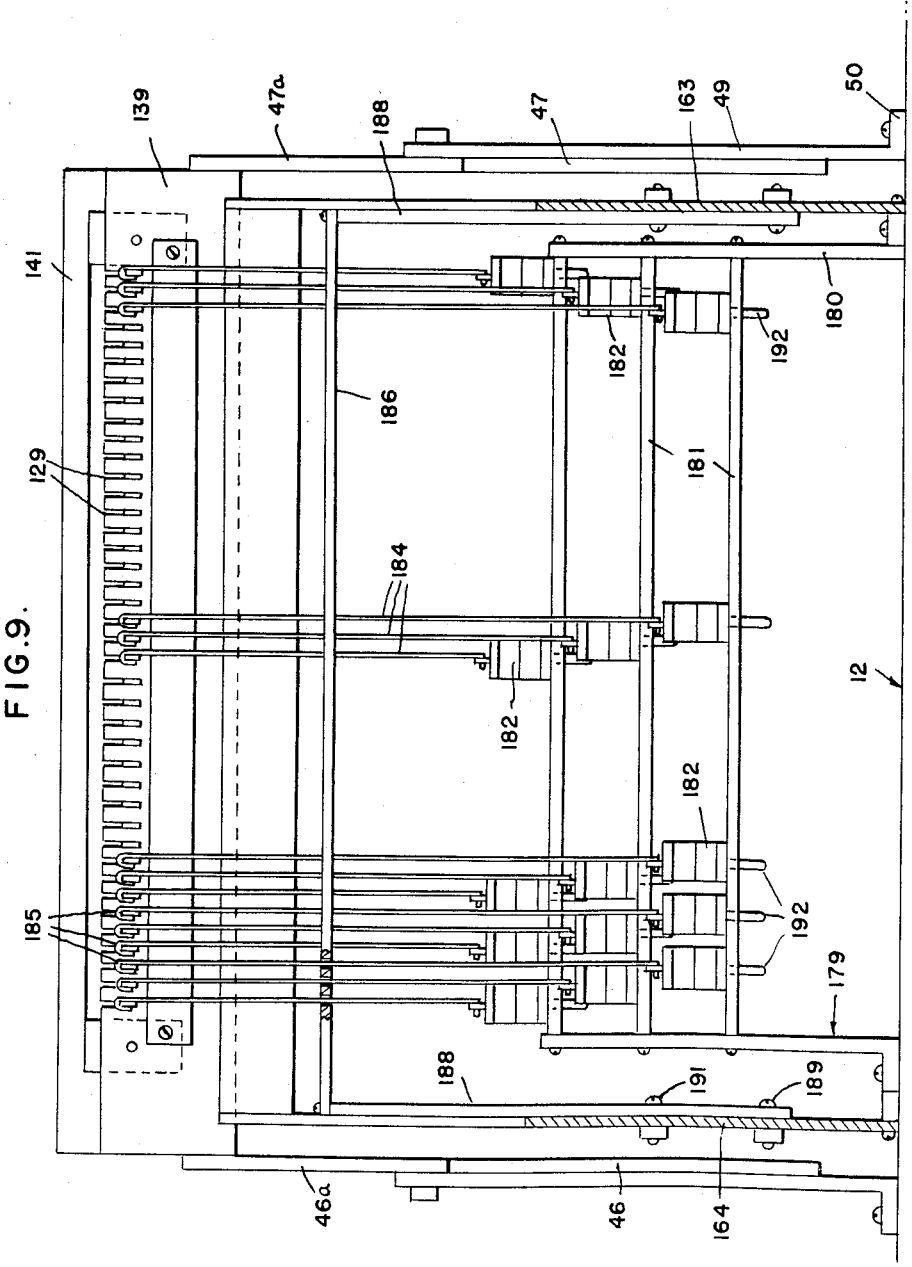
Fig. 9 is a transverse section taken substantially on the line 9—9 of Fig. 7.

Referring now more particularly to the drawings, it will be seen that the apparatus of the present invention, in the major part thereof, is illustrated as contained within a case or housing which is generally designated 10 and which is designed to facilitate transportation of the apparatus from place to place.

While the apparatus as above stated has been shown as contained within a carrying case or housing, nevertheless, it is to be understood that the invention is not necessarily restricted to the use of such a case or housing for containing the mechanism in the several parts thereof to be hereinafter particularly described as any other suitable type of enclosure and supporting means therefor may be used when the apparatus is set up for operation.

The housing 10, as illustrated, is composed of three major parts or sections which can be readily separated one from the other for the purpose hereinafter set forth. These sections or parts comprise the bottom or base 12, the mechanism enclosing wall portion 14 which comprises the longitudinal side walls 14a and the end walls 14b and 14c which, for convenience of description may be further defined as the front end and the back end walls respectively.

The reference numeral 16 designates the third part of the housing structure which forms the top or lid and which is removably positioned upon the top of the enclosing wall portion 14 and embodies in addition to the top wall 16a, the side flanges 16b and end flanges 16c. These flanges, as shown in Fig. 1, rest upon the top edges of the side and end walls when the housing is closed and are secured to the wall portion 14 by latches 18 of a suitable character such, for example, as the well known trunk latches.

The bottom edges of the side and end walls of the portion 14 rest upon the base 12 as shown and are held in position by positioning strips 20 secured to the top surface of the base as shown in Fig. 5, for example, and the wall portion is detachably connected to the base by latches 21 similar to those indicated at 18.

The back end wall 14c has an opening 22 therein, see Fig. 15, which is closed by a door 23 hingedly attached to the back wall as at 24, for the purpose hereinafter described.

While the scoring apparatus together with the hereinafter described typewriter or suitable keyboard structure may be set up for use upon any suitable table or support, the housing lid or cover 16 is designed to serve or function as a table in the manner illustrated in Fig. 2.

In order that the top or cover 16 may be employed as a table, there is hingedly attached to the inside at each end a leg frame 25. Each of these leg frames, as shown in Fig. 3, is substantially rectangular in form and is of a width to fit between the side flanges 16h, the leg frame embodying the two side members 26, the inner cross bar 27 and the outer cross bar 28.

The inner bar 27 is secured to the under side of the cover top wall by hinges 29 so that the leg frame may be swung down to a folded position within the cover and when it is swung outwardly to a position of use it will abut against the adjacent end flange 16c where it is braced in position by the brace bar 30.

When the leg frames are in folded position, the bars 28 thereof will be disposed in relatively close relation and secured in position by a cross strap 31 having apertured end portions 32 to receive bolts 33 passed through the wall 16a. These bolts may be supplied with conventional wing nuts as shown and when the legs or leg frames are in opened position and the brace bars are placed in position the inner ends of the brace bars which are apertured will receive the bolts 33 and be secured by the wing nuts thereof.

The outer ends of the brace bars are suitably angled as shown and apertured to receive holding bolts passed therethrough and through the bar 28 in the manner illustrated.

When the legs or leg frames are closed within the cover or top and held in position by the angled strap 31, the brace bars 30 may be stored in the housing each along the inner side or upon the top of a positioning strip 20.

When the leg frames are in open position the top or cover will function as a table as shown in Fig. 2 and the apparatus is then positioned on the table across one end and adjacent to the apparatus there is placed on the table, a control typewriter such as that shown in Fig. 2 and generally designated T or any other suitable mechanism having a keyboard similar to a typewriter and here generally designated 34.

For the control or operation of the scoring mechanism hereinafter described, any suitable typewriter structure may be used. Preference is had, however, for an electrically operated typewriter of the general nature of that shown in Fig. 2, which has a body frame portion 35 beneath the keyboard 34.

The numeral 36 designates a base upon which the typewriter is mounted and this base has an open area 37 lying beneath the keyboard 34 and frame 35 for the purpose about to be described.

The frame 35 has secured thereacross and to the under side thereof below the typewriter keys, a key harness which is generally designated 38 and which comprises a bar 39 attached at its two ends by straps 40 to the sides of the frame 35. This bar 39 has formed in the lower side thereof the transverse downwardly opening slots 40' corresponding or exceeding in number the number of typewriter keys and extending longitudinally of the bar 39 across the slots 40' is a wire shaft 41.

Each of the slots 40' has set therein the mid portion of an impulse valve actuating finger 42, one end of which is operatively coupled by a wire 43 with the electric typewriter type key actuating cam, not shown, while the opposite end of the finger 42 is suitably formed to actuate an impulse valve element when properly positioned with respect thereto as hereinafter described.

In Figs. 2 and 4 the scoring machine is shown in the lower part or shell portion of the housing with the top of the housing removed while Fig. 5 and 6 show the right and left hand side of the apparatus removed from the confines of the enclosing wall structure but resting upon and secured to the bottom or base of the housing. Certain other parts of the machine are also removed in these last two mentioned views as will be understood from the following description.

The inside width of the housing is materially greater than the overall width of the machine and the spaces between the sides of the machine and the side walls 14a of the housing are closed at the top by the fixed shoulder boards 44 which extend from the back end of the housing through the major portion of the length thereof and have hingedly attached at their forward ends as indicated at 44', the side access doors 45 which when opened give access to the resetting knobs of the hereinafter described counters and to control switches for the vacuum pump and paper feed operating motors of the machine.

Referring now particularly to the perspective views of the machine as shown in Figs. 5 and 6, it will be seen that the machine is embodied in three separte and independent units which comprise the mechanical unit which is generally designated M; the vacuum unit which is generally designated V and the counter unit which is generally designated C. These three units will be individually described, as far as possible, starting with:

*The mechanical unit*

The assembly M comprises right and left side wall plates 46 and 47 respectively which at their rear ends are secured in upright position to the base 12 by the angular foot brackets 48.

At the forward ends of the plates 46 and 47 a substantial portion of the lower part of each plate is cut out forming the forwardly extending upper parts 46a and 47a. The cutting away of the lower portions of these side wall plates at the forward ends thereof is primarily for the purpose of reducing the weight of the structure and each plate at its forward end is secured to a suitable upstanding leg 49, the lower end of which is anchored to the base 12 in a suitable manner as by an angular foot plate 50.

The side wall plates 46 and 47 are secured together substantially midway of their ends and adjacent to the lower edges thereof by the cross brace bars 51.

The foot brackets 48 and supporting legs 49 maintain the bottom edges of the side wall plates spaced slightly above the surface of the base 12 and secured to the bottom edges of the plates and extending across between the same adjacent to the rear ends thereof is a motor mount plate 52.

Mounted on and secured to the motor mount plate 52 is an electric motor 53. The end of the motor adjacent to the wall plate 46 is connected in driving relation with a reduction gearing mechanism which is generally designated 54 and which extends outwardly through an opening 55 in the adjacent wall plate 46.

Secured to the outer side of the wall plate 46 above the opening 55 is an outwardly extending lug 56 to one side of which is secured the upper end of a vertically disposed arm plate 57 which lies in a plane perpendicular to the wall plate 46 and has an outwardly offset lower end portion 57a which is braced to the lower part of the wall plate 46 below the opening 55 by the threaded pin or screw 58.

The numeral 59 designates a short power delivering shaft forming a part of the speed reduction mechanism 54. This shaft 59 is directed forwardly and carries a sprocket gear 60 and passes behind the offset portion 57a of the arm plate 57.

Above the power delivery shaft 59 the arm plate 57 carries one end of a counter shaft 61 which is parallel with the power delivery shaft 59 and extends forwardly and has its other end rotatably supported in a bearing lug 62 mounted upon and extending outwardly from the outer side of the wall plate 46 as best seen in Figs. 5 and 7. This counter shaft 61 carries a sprocket gear 63 which is connected to the sprocket gear 60 by the chain 64.

Also mounted upon and secured to the counter shaft 61 is the rubber tired power transmitting or driving wheel 65, the periphery of which, on the inner side extends through the wall plate opening 55 for driving connection with the parts about to be described.

The numeral 66 generally designates the graph paper tape supply and the roll of such paper is designated 67. This paper roll is supported upon a shaft 68 between end flanges 69 which are adjustably secured to the shaft and maintain the paper roll in position thereon. Also one or the other of the flanges 69 is removable to facilitate the extension of the shaft through the paper roll.

The shaft 68 is supported at its ends in upwardly opening bearing brackets 70 which are secured to the inner faces of the wall plates 46 and 47 at the desired position forwardly of the operating motor and the shafts 59 and 61 as is clearly shown in Figs. 5 and 7 and the paper roll and shaft are supported for free rotation in these bearing brackets 70.

Forwardly of and at a slightly higher elevation than the paper roll supporting shaft 68 there is rotatably supported between the side wall plates 46 and 47 a paper guide shaft or spindle shaft 71 on which are mounted the spaced discs 72 between which the paper tape passes from the roll 67 in the operation of the machine in the manner hereinafter set forth.

The numeral 73 designates a power transmitting cross shaft which is rotatably supported at its ends in suitable bearings in the side wall plates 46 and 47 and which is located rearwardly of the paper roll adjacent to the drive wheel 65.

Upon the end of the cross shaft 73 adjacent to the drive wheel 65, there is fixed the power receiving or thrust disc 74 against the outer face of which the periphery of the rubber tire drive wheel 65 bears, whereby to deliver power from the motor to the cross shaft 73.

The opposite end of the cross shaft 73 carries two sprocket gears 75 and 76 from which power is delivered by means of the sprocket chains 77 and 78 respectively to the paper tape take-up spool and the tape drive roll which are designated generally respectively 79 and 80.

Figure 12:
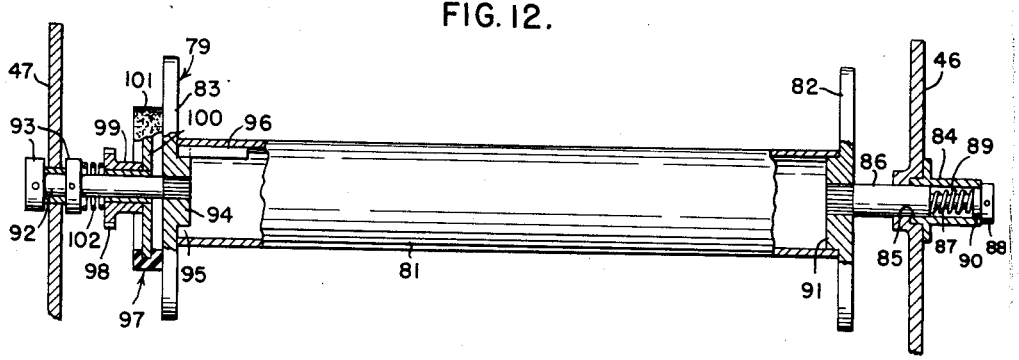
Fig. 12 is a sectional detail taken substantially on the line 12—12 of Fig. 5 showing the mounting and slip clutch drive for the paper tape take-up spool.

The paper take-up spool 79 is formed in three separate parts and is mounted between the wall plates 46 and 47 as illustrated particularly in Fig. 12.

The three parts of the take-up spool comprise the hub 81 which, preferably, is made as here illustrated in the form of a tube which is held between and joined at its ends to the end flange plates or discs 82 and 83.

The take-up spool hub 81 is supported between the plates 82 and 83 to be easily and quickly removed with the paper tape wound up thereon and such mounting means is illustrated in its preferred form in Fig. 12 and is constructed as follows.

The side wall plate remote from the drive chains 77 and 78 carries the short outwardly extending guide sleeve 84 which is open at its outer end and at its inner end opens through a bearing 85 in the wall plate 46 to which the sleeve 84 is secured.

Supported in the bearing 85 for both rotation and axial movement is an end portion of an idler stub shaft 86 from the outer end of which a reduced stem 87 extends through the guide sleeve 84. The outer end of this stem 87 has secured thereon a stop collar 88 which limits the inward movement of the stem and shaft by engagement against the outer end of the sleeve and within the sleeve and encircling the stem 87 is an expansion spring 89, the inner end of which bears against the shoulder formed at the inner end of the stem, while the outer end of the spring bears against a retaining collar 90 fixed in the outer end of the sleeve and through which the stem passes.

The idler stub shaft passes through and is secured to the center of the plate 82 and normally the plate 82 is spaced a substantial distance inwardly from the wall plate 46 as shown in Fig. 12 so that in removing and replacing the spool hub 81 the plate can be shifted outwardly against the resistance of the spring 89 so that the opposite end of the hub can be detached from the plate 83 to which it is coupled in the manner about to be described.

The inner face of the plate 82 has fixed thereto or formed as an integral part thereof a circular shoulder 91 which is of a diameter to engage snugly in the open end of the spool hub 81 for support of the latter.

The wall plate 47 supports in alignment with the shaft 86 a drive shaft 92 for the tape spool. As shown in Fig. 12, one end of the shaft passes through a suitable bearing in the wall plate 47 and is retained against axial movement by the collars 93 secured thereon with the wall plate between them.

The inner end of the shaft 92 is fixed in the center of the flange plate 83 and upon the inner side of the flange plate concentric with the shaft is a circular clutch shoulder 94 in the periphery of which are formed notches 95. This shoulder 94 is received in the adjacent open end of the spool hub 81 and fixed to the inner surface of the hub is a key 96 which is formed for engagement in one of the notches 95 to thus establish a driving connection between the hub 81 and the plate 83.

The shaft 92 carries between the inner collar 93 and the plate 83, a slip clutch which is generally designated 97. This clutch comprises a sprocket gear 98 around which the sprocket chain 77 passes, a hub sleeve 99 extending inwardly from the gear and a plate 100 encircling the shaft 92 and secured to the sleeve 99. This plate carries around its periphery a friction ring 101 which is constantly urged into frictional engagement with the adjacent face of the plate 83 by the expansion spring 102 which encircles the shaft 92 between the sprocket gear 98 and the adjacent collar 93 as shown.

Figure 13:
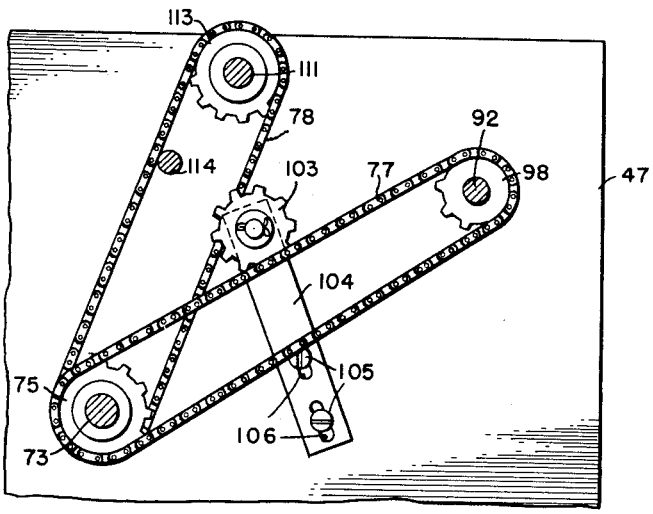
Fig. 13 is a detail section taken across the transverse drive shaft and the axes of the take-up spool and feed roller showing the chain drive between the parts.
Figure 19:
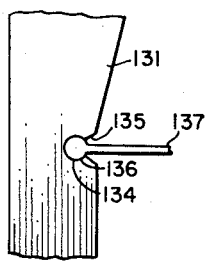
Fig. 19 is a view on an enlarged scale of a portion of one leg of a punch pin actuating lever showing details of the connection between the punch pin and the leg.

In Fig. 13 there is shown a tension wheel 103 which is carried by an adjustable support 104 secured to the inner side of the wall plate 47 by screws 105 which pass through adjustment slots 106 in the body or bar 104.

The paper tape drive roll 80 comprises a roller body 107 of substantial diameter which embodies a relatively thick rubber tread 108 upon a core 109 and from each end of this core there extends a supporting trunnion, one of the trunnions beings designated 110 and the other 111. The tape drive roll, as shown, is disposed at the slightly higher elevation than the take-up spool 79 so that the rubber tread extends a slight distance above the plane of the top edges of the side wall plates 46 and 47 and the roll is in a vertical plane between the paper tape roll and the take-up spool.

The trunnions 110 and 111 are rotatably mounted in bearing units 112 carried by the side wall plates, as shown, and the trunnion 111 carries the sprocket gear 113 with which the sprocket chain 78 is connected as shown in Fig. 13.

Just below the roller 107 and on the side thereof remote from the tape take-up spool, a small diameter paper guide bar 114 is positioned which extends across between the side wall plates and is rotatably supported thereby.

Fig. 7 shows diagrammatically the approximate path of travel of the paper tape from the roll 67 to the take-up spool, which path will be more specifically outlined hereinafter following the description of the marking or punch mechanism by which the desired record is made in the tape as it proceeds from the feed roll to the take-up spool.

Adjacent to the forward end of the mechanical unit of the apparatus, is the tape punch mechanism which is generally designated 115.

Figure 14:
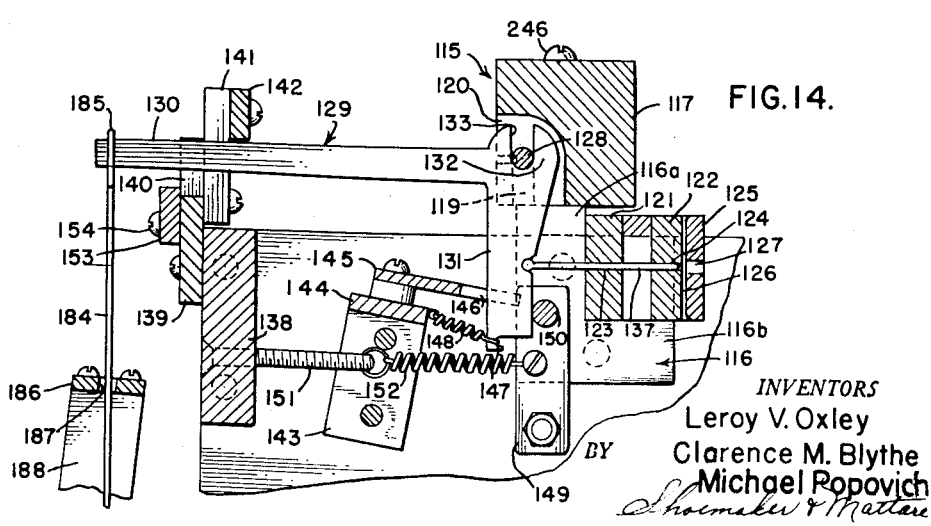
Fig. 14 is a sectional detail on an enlarged scale taken substantially on the line 14—14 of Fig. 10.

Upon the inner side of each of the side wall plates 46 and 47, there is secured adjacent to the forward end of the wall plate, an angle bracket 116 which is approximately L-shaped as shown in Fig. 14 and has the vertical arm of the figure extended upwardly slightly beyond the top edge of the adjacent wall plate as indicated at 116a while the horizontal arm of the figure which is designated 116b is directed rearwardly.

Mounted at its ends upon the top ends of the upright arms 116a of the two angle brackets and extending across the width of the apparatus is a bar 117 which forms a key frame as hereinafter described and this bar is held in place by screws 118 which extend downwardly therethrough and into the top end of the adjacent angle bracket part 116.

Formed in the under side of the key frame bar adjacent to the forward side thereof and extending throughout the length of the bar is a channel 119.

Also formed in the key frame bar and opening through the rear face and through the under face and extending across the channel 119 are relatively closely spaced parallel slot recesses 120. There are approximately forty of these slots or there may be as many more as required to equal the number of keys on a typewriter in association with which the scoring apparatus is used.

Extending across between the side wall plates 46 and 47 and resting upon the horizontal portion 116b of the angle brackets are two transversely extending spaced parallel forward and rear punch pin guide plates 121 and 122 respectively which have the longitudinal rows of punch pin apertures 123 and 124. The apertures of the forward plate are each aligned with an aperture of the rear plate and these apertures in each plate correspond in number to the slot recesses 120.

The rearmost plate 122 functions as a die guide in cooperation with a stripper plate 125 which is secured to the rear face of the plate 122 in slightly spaced relation therewith to provide the paper tape guide slit 126. This stripper plate is also provided with a longitudinal row of apertures which equal in number the apertures of the two adjacent plates 121 and 122 and which are designated each by the reference character 127.

Extending through the upper part of the channel 119 and secured therein is a key shaft 128. This key shaft supports a plurality of bell crank keys, each of which is generally designated 129. These bell crank keys may equal in number the slot recesses and each key embodies a long leg 130 and a short leg 131 and at the joined ends of these legs is a pivot disc 132 which positions in a slot recess 120 as shown in Fig. 14.

The pivot disc 132 of each bell crank key has an upwardly opening shaft receiving slot 133 in which the shaft 128 engages when the disc portion of the key is placed in position in a slot recess 120.

The key legs 130 and 131 are substantially right angularly disposed and the leg 130 normally extends horizontally forwardly in the mechanism while the leg 131 extends downwardly across and spaced from the forward side of the forward plate 121.

At the rear edge of each key leg 131 there is formed the transverse circular opening 134 which opens through the adjacent rear edge of the key leg by way of an outwardly flared slot 135.

Engaged in each of the openings 134, for turning movement, is the round head 136 of a punch pin 137 which extends rearwardly through adjacent aligned apertures 123 and 124. In the inoperative position of the punch pin the end thereof is slightly forward of the paper guide slot 126 and in line with an opening 127 as shown in Fig. 14.

The forward ends of the side wall plates 46 and 47 are coupled together by the transverse end plate 138 and secured to and extending across the forward face of this end plate is a key guide plate 139, the top longitudinal edge of which extends a substantial distance above the end plate 138 and is provided with transverse upwardly opening guide slots 140 for, and in each of which lies, the forward end of a crank key horizontal leg 130.

At each end of the key guide plate 139 an upstanding leg 141 is fixed which rises above the crank key legs 130 and supports one end of a transverse stop bar 142 which extends across the mechanism above and limits the upward movement of the bell crank legs 130.

Between the depending legs 131 of the bell crank keys and the end plate 138, there is supported between the side wall plates upon suitable block members 143 the transverse spring support bar 144 and this bar supports in turn a key guide plate 145, the rear edge portion of which extends rearwardly beyond the bar 144 and is slotted as indicated at 146. Each of these slots has engaged therein and functions to guide the downwardly extending leg 131 of a bell crank key as shown.

The lower end of the downwardly extending leg 131 of each bell crank key is formed in a suitable manner, as by the provision of a hook 147, to have attached thereto one end of a spring 148, the other end of which spring is attached to the adjacent spring support bar 144. These springs are constantly under tension to exert a forward pull upon the attached leg 131 whereby to maintain the attached punch pin 137 in fully retracted position.

Below the key frame bar 117 there is pivotally attached to the inner side of each of the plates 46 and 47, an upwardly extending arm 149 and the upper ends of these arms are connected by a transversely extending rod 150 which is disposed at an elevation slightly above the lower ends of the depending legs 131 of the bell crank keys, against the rear edges of which depending legs the bar is normally engaged.

The end plate 138 carries adjacent to each side of the mechanism a rearwardly extending anchor pin 151 to which is attached one end of a tension spring 152, the other end of which spring is attached to the adjacent tension bar arm 149. These springs function to constantly pull the tension bar 150 forwardly to return the bell crank keys to inoperative position after a tape punching operation is performed.

In addition to the transverse stop bar 142 which limits the upward swinging movements of the legs 130 of the bell crank keys, there is disposed across the front side of the key guide plate 139, a check bar 153 which is held in place by screws 154 passing through vertical slots in the check bar so that the bar may have slight vertical adjustment. The top edge of the bar extends above the bottom ends of the slots 140 as shown in Fig. 14 and checks the downward movements of the bell crank key legs 130 under the action of the hereinafter described vacuum operated mechanism.

The side plates 46 and 47 support on their top edges forwardly of the punch mechanism 115, a backing board 155 which extends from the rear side of the stripper plate 125 to the rubber roll 108. This backing board 155 is attached by hinges 156 to an end panel 157 which extends from the rear side of the roll 108 to the ends of the side plates. This backing board and door panel 157 close the space between the shoulder boards 44 from the punch mechanism rearwardly as shown in Fig. 4.

To maintain the backing board and the rear door panel 155 and 157 in position, flange strips 155a are secured along the underside of the backing board and upon the underside of the door panel are corresponding strips 157a.

Between the adjacent or opposing edges of the board 155 and door panel 157 a slot 158 is provided by cutting away one of such opposing edges to a width across the door panel or the backing board slightly greater than the width of the roll 108 and the paper 67. In Fig. 4, this slot 158 is shown as formed in the forward edge of the door panel 157 but if desired, it may be made in the rear edge of the backing board as will be obvious.

The backing board 155 provides a supporting surface across which or along which in the direction of the length of the machine the graph paper strip extends from the guide slot 126 from which it issues to the slot 158 and to and around the rubber roll 108. Thus a means is provided not only for supporting the exposed length of record paper but for facilitating the writing thereon of any desired information or for the making of corrections on the paper.

The record tape or paper 67 is, as hereinbefore stated, laid off in a similar manner to graph paper, having parallel longitudinal lines and quarter inch spaced transverse lines 78b every tenth one of which is heavy as indicated at 78c, thus dividing the paper into longitudinal columns of ten blocks or squares between the heavy transverse lines.

The numeral 159 designates a transparent guide and symbol carrying strip which may be formed of clear plastic or any other suitable transparent material. This strip 159 extends across the record paper or ribbon adjacent to and parallel with the stripper plate 125 and has thereon or carries a longitudinal row of symbols such as the letters of the alphabet or any other desired symbol characters, each of which lies over and identifies a longitudinal column of squares or blocks of the record strip. One end of this guide and symbol carrying strip 159 is pivotally attached as at 160, to the backing board while the opposite end is slotted as indicated at 161 for releasable engagement with a headed pin 162 carried by the backing board at the opposite side of the record strip or tape 67 from the pivot 160.

Counter unit

At the front end of the mechanism there are secured to the bottom or base 12, forwardly of the side plates 46 and 47 the transversely spaced upstanding counter supporting plates 163 and 164 which, as illustrated particularly in Figs. 5 and 6, are respectively at the right and left hand sides of the structure, being inset slightly with respect to the adjacent side plates 46 and 47 respectively.

The two supporting plates 163 and 164 support between them transverse bellows carrying bars 165 which in the present mechanism are shown as being four in number and each of which supports a series or group of bellows forming a part of the vacuum system as hereinafter set forth.

Also supported upon the plates 163 and 164 is the removable counter frame 166 which embodies right and left side wall plates 167 and 168 connected by pairs of transverse counter unit supporting bars 169 and a transverse frame support bar 170.

The back edge of each of the counter mechanism supporting plates 163 and 164 is recessed as indicated at 171 to receive the frame support bar 170 and the wall plates 167 and 168 are spaced apart so as to be disposed on the outer sides of the adjacent supporting plates 163 and 164 respectively as is clearly shown in Figs. 5 and 6. The frame 166 is thus rockably supported by the plates 163 and 164 through the medium of the support bar 170 and the top edges of the plates 167 and 168 are maintained in substantially horizontal position by screws 172 or other suitable means which pass through the wall plates 167 and 168 into the adjacent plates 163 and 164.

Each pair of transversely extending bars 169 supports and holds in side-by-side relation a transversely extending row of conventional counters, each of which is designated 173 such, for example, as the counters known under the name of Veeder-root. Each of these counters embodies a finger actuating button 174, a window 175 through which is shown the amount totaled by the counter and a panel 176 on which may be marked an identifying symbol.

In the structure here illustrated there are four rows of counter units 173 with ten units in each row making a total of 40 corresponding to the number of bell crank keys and punch pins.

The reset means for each counter unit is replaced in the series of ten by a continuous reset (not shown) which extends through the series of ten aligned units and may be actuated from either side of the counter mechanism by rotating the reset buttons 177.

Since the counter units referred to are of conventional and well known construction, it is not believed that a further description of the same is necessary to an understanding of the operation of the counters in the mechanism.

Each of the counter units may be operated independently of the others by depressing the buttons 174 but for the mechanical or automatic operation of the units in association with and simultaneously with the actuation of the bell crank keys by the hereinafter described vacuum mechanism, each of the buttons 174 is provided with or has secured to its underside, a relatively long depending actuating finger 178.

Vacuum system

Supported upon and secured to the base 12 below the bell crank keys 129 is an upstanding bellows supporting rack which is generally designated 179 and which comprises the upright posts 180 which are spaced apart transversely of the base 12 and between which posts are supported the vertically spaced transverse shelf bars 181.

Each of the shelf bars 181 has secured thereon a number of vacuum motors in the form of bellows 182. The total number of vacuum motors 182 supported on the shelf bars equals the numbers of overlying bell crank keys 129 and each of the bellows has secured to the top side an apertured finger 183 with which is connected the lower end of a link wire 184 which extends upwardly and has its upper end hooked as at 185 over the top of the rear end of a crank key leg 130.

The numeral 186 designates a wire link guide bar which has a plurality of apertures 187 therethrough and which is supported at its ends upon upwardly and rearwardly inclined arms 188. The lower end of each of these arms is attached by a pivot screw 189 to a side face of an adjacent one of the counter mechanism supporting wall plates 163 or 164. Each of these plates above the screw 189 has a short arcuate slot 190 struck from the center of the screw 189 and engaged in this slot and carried by the adjacent arm is an adjustment securing screw 191. In this manner the apertured bar 186 can be located in the exact position necessary for the free extension of a link wire 184 through an aperture therein.

The bellows 182 are of conventional form and the fingers 183 are secured to one side thereof while the opposite side of the bellows which is secured to the supporting shelf bar 181 carries a nipple 192 which is in communication with the interior of the bellows and has connected therewith one end of an air tube 193. The manner in which these air tubes 193 are connected with the vacuum producing source is hereinafter described.

Each of the bellows bars 165 which is disposed below and parallel with a transverse row of counter units has a counter unit actuating bellows 194 secured thereto which is directly below a counter unit which it is designed to actuate. As shown, one side of each bellows 194 is firmly or rigidly secured to the supporting bar 165, while the opposite side is movable so that upon reduction of air pressure within the bellows the opposite side will move toward the fixed side in an obvious manner. The movable side of each bellows 194 carries a counter unit actuating arm 195 which extends upwardly and at its upper end is adjacent to and in slightly spaced relation with the lower end of a counter unit actuating finger 178.

The opposite or fixed side of each bellows 194 carries an air nipple 196 which is in communication with the interior of the bellows and to which is attached an end of an air tube 197. Each of these air tubes 197 is connected with an air tube 193 of a punch pin actuating bellows 182 in a suitable manner as, for example, by means of a three-way coupling 198 and each of these couplings 198 is connected as indicated at 199 to a nipple 200 of a secondary or booster valve which is generally designated 201 forming one of a bank of such valves which is generally designated 202. These secondary valves are of well known construction and one only is illustrated in transverse section in Fig. 11. However, in the bank 202 illustrated in Figs. 5, 6, 7 and 11, there is shown, particularly in Fig. 11, three vertically stacked tiers, each of which tiers comprises two rows of valves, there being in all in the bank as many such valves as there are punch pin actuating bell cranks and counter units. In other words, each secondary valve is connected on one side by the nipple 200 thereof with a bellows 182 and a bellows 194.

In the valve structure illustrated in section in Fig. 11, there is an atmosphere chamber 203 with which the nipple 200 is connected and which is normally open to the atmosphere by way of the port 204.

The numeral 205 designates the vacuum or evacuated chamber which may be put into communication with the chamber 203 by the poppet controlled passage 206. The upper end of this passage 206, that is, the end of the passage opening into the chamber 203 is normally closed by a poppet valve 207 having the stem 208 which extends through the passage 206 into the evacuated chamber 205.

The top of the poppet 207 is below the port 204 so that when the poppet is elevated it will close this port and establish communication between the chambers 203 and 205 and the stem 208 extends downwardly through the chamber 205 into a pouch recess 209 which is covered by the normally downwardly flexed diaphragm 210.

Leading into the lower part of the pouch recess below the diaphragm is a coupling nipple 211 to which is connected one end of an air line 212.

The vacuum chamber 205 is common to all of the secondary valves in the tier and a common vacuum line 213 leading from a suitable vacuum or reduced pressure creating source is connected with the vacuum chambers 205 of the tiers of valves. In the arrangement of the tiers of secondary valves here illustrated, each end of the bank has an air passage 213a running downwardly therethrough and opening into the chambers 205 for the different valves. At the top of each of these vertical air passages is a nipple 214 with which the vacuum line 213 is connected by the lateral or diverging pipes or tubes 215 as is clearly shown in Figs. 5 and 6.

Referring now to Figs. 7, 16 and 17, the numeral 216 generally designates a bleed unit for bleeding off air from beneath the diaphragms 210 of the secondary valves after each valve has been actuated. This bleed unit comprises a long flat bottom plate 217 in which is formed a manifold slot 218 which extends through the major portion of the length of the plate.

Extending horizontally into the plate 217 from one side edge are a number of air admission passages 219 in the outer end of each of which is a nipple 220 with which is connected an air tube hereinafter referred to.

The inner end of each of the air passages 219 is connected with the manifold 218 by a small diameter bleed bore 221.

Leading upwardly from each of the air passages 219 is a vertical air passage 222 which passes through a gasket 223 and through a top plate 224 and has secured in its upper end an air tube nipple 225 with which is connected an air line 212.

Also extending into the bottom plate of the bleed unit and having communication with the manifold slot 218 is a vacuum passage 226 (Fig. 16) in the outer end of which is fixed an end of a nipple 227 and this nipple is connected by the tube 228 (see Fig. 7) with the vacuum pipe 213 which is connected at one end through the lateral tubes 215 with the nipples 214 of the secondary valves while its other end is connected to a vacuum pump or other means for creating a reduced pressure in the tube or pipe 213 and in the vacuum chambers 205 of the secondary valves.

In Fig. 7, the numeral 229 generally designates a source of vacuum which may be any suitable type of vacuum pump. This preferably is a pump of a suitable small size which may be mounted within the apparatus as, for example, upon the motor mount or motor supporting plate 52 with a suitable electric motor (not shown) for operating the pump.

For the control of the drive motor 53 of the mechanical part of the mechanism and the motor (not shown) for operating a suitable vacuum pump, a switch mount such as the plate 230 may be secured upon one of the side plates, such as the side plate 46 as illustrated in Fig. 5, to support the switches 231 and 232 from which pass wires in a cable 233 to the operating motors for the mechanical and vacuum systems.

The actuation of the keys upon the typewriter keyboard or other suitable keyboard effects the transmission of an air impulse to one of the secondary valves by means of an impulse valve unit such as is illustrated in Figs. 7 and 15, and generally designated 234. This impulse valve unit is secured in a suitable manner as hereinafter described below the keyboard and rearwardly of the key harness unit 38 which embodies the plurality of pivotal levers 42 which are each connected with a key, or with mechanism under the control of a key, whereby upon the depression of the key of the typewriter keyboard the lever 42 connected therewith or controlled thereby will be oscillated on the pivot 41. This oscillation of any one of the levers 42 will effect the opening of a valve which will admit an air impulse to an air tube 235 connected to one of the nipples 220 of the bleed unit.

The impulse valve unit 234 comprises a long plate 236 which carries at each end the swivel nut 237 formed with the knurled head 237a as illustrated in Fig. 18. These swivel nuts 237 on the ends of the bar 236 serve the double purpose of securing the impulse valve unit in position across the underside of the typewriter keyboard to the base 36 upon which the typewriter is shown mounted in Fig. 2 or to any other suitable carrier which is provided with fixed threaded studs, as hereinafter set forth, with which the swivel nuts may connect.

Also when the scoring mechanism is to be closed up for transportation, the impulse valve unit may be removed from the supporting base 32 beneath the typewriter keyboard and secured to the inner side of the door 23 which is pivotally secured to the back wall 14c of the mechanism housing as shown in Fig. 1. For this purpose the door 23 is provided with the threaded studs 238 with which the swivel nuts may be coupled, as shown in Fig. 18, so that when the door is closed the impulse valve unit will be located inside of the housing and suitable means 23a is provided for securing the door in this closed position from the inside of the housing, access to which securing means for the door 23 is had by opening the door 157.

The impulsive valve unit 234 is of the same design or construction and functions in exactly the same manner as the unit shown and described in our copending application Serial No. 510,791 of May 24, 1955, for Master and Slave Control Typing System and Structural Units For Use Therein. Accordingly only such a general description of the unit will be given as is sufficient to understand its operation in the present system.

The unit 236 is provided with a plurality of longitudinally spaced transverse air inlet ports 239 as shown in Fig. 15, and one of which is shown in Fig. 7. Each of these ports is covered at one end by a valve pad 240 (Fig. 7) carried by a resilient arm 241 which is normally urged toward the plate by a spring 242 for the closing of the port by the pad 240. The outer end of this arm carries an upturned finger 243 and each of these fingers has its free end in opposed relation with the free end of a lever 42 so that when such lever is rocked in the required direction by the actuation of the key to which the lever is coupled, is will press down upon the spring arm and open the adjacent port 239.

The opposite or top end of each of the air inlet ports has secured therein an end of a nipple 244 and each of these nipples has connected therewith the other end of an air impulse tube 235 which leads from a nipple 220 of the valve bleed unit 216.

It will be understood, of course, from the foregoing that the mechanism as illustrated in Figs. 5, 6 and 7, when set up for use will be completely encased in the enclosing portion 14 shown in Figs. 1, 2 and 4.

The backing board 155 when placed in position with the rear door panel 157 will lie between the shoulder boards 44 and thus cover the mechanical mechanism rearwardly of the bell crank keys and the access doors 45 at the front end of the housing, joined to the shoulder boards by the hinges 44', will position at opposite sides of the counter mechanism and cover the reset buttons 177.

The mechanism lying between the forward punch pin plate 121 and the rear part or rear side of the counter mechanism is covered by a suitable hood 245 which may be secured in position by screws 246 threaded into tapped holes in the key frame bar 117 or any other suitable means may be employed for securing the cover or hood in position.

Prior to placing the backing board in position an end of the record tape is drawn off from the roll across the underside of the guide spindle 71 between the disc 72 thereon and passed up through the guide slit 126 in the manner illustrated diagrammatically in Fig. 7. The backing board is then placed in position and the end of the record tape drawn rearwardly across the top of the backing board and extended through the slot 158 across the top of the rubber roller body 107 and wound or wrapped several times around the take-up spool hub 81. The door panel 157 may then be closed and after the symbol carrying guide strip 159 is placed in position across the top of the record paper tape the machine will appear as it is shown in Fig. 4 ready to be placed into service.

The air tubes 235 connecting the bleed unit 216 with the impulse valve unit 234 are of substantial length and may be encased as a bundle in a covering sheath 247 as shown in Figs. 5 and 6. In the transportation of the machine these tubes will be placed within the housing through the door opening 22, after which the impulse valve unit will be secured to the inner side of the door 23 and when the door is closed and secured or locked from the inside of the housing all of the tubes and the impulse unit will be covered or protected. When the machine is put into operation, this impulse unit 236 is removed and secured, as previously stated, across the underside of the typewriter keyboard in the proper position for the engagement of the finger 243 of each valve pad carrrying arm 241 by a key actuated lever 42.

In our copending application Ser. No. 510,791 hereinbefore referred to, there is illustrated an impulse valve unit of the same construction as the unit 234 here shown and there is also illustrated a key harness unit of the same construction as the unit 38 shown in the present case. Also shown in this prior application are means for mounting these two units respectively upon the typewriter supporting base 36 and the underside of the frame of the typewriter.

Fig. 15 here illustrates similar mountings for these two units wherein the numeral 35a designates an existing lug upon the typewriter frame on each side thereof and beneath the typewriter key mechanism. Upon the lugs 35a which are upon opposite sides of the bottom part of the typewriter frame are attaching plates 40a for mounting straps 40 at the two ends of the bar 39.

The typewriter supporting base 36 at opposite sides of the opening 37 has secured therein the upwardly projecting studs 37a with which are connected the swivel nuts 237 carried by the ends of the plate 236 whereby the impulse plate 234 after being removed from the housing when the machine is set up for use, will be secured firmly in operative position to the base beneath the typewriter for the actuation of the valve pad carrying spring arms as hereinbefore set forth.

The machine of the present invention is generally set up for use on the infield at a race track where the racing cars are to be observed and scored and in a position where the operator of the machine, more particularly the keyboard 34 thereof, can face the starting line of the track.

As previously described the machine is conveniently set up upon the lid or cover 16 of the housing for the mechanism, in the manner shown in Fig. 2, the legs 25 which are folded within the cover being opened out and braced in the manner shown in Fig. 3 and the body of the machine disposed across one end of the top of the cover which now constitutes a supporting table, while the typewriter or other suitable keyboard mechanism is set up on the other end of the cover table at the side of the machine housing.

Each of the machines in the race carries a suitable identifying symbol or character such as a letter of the alphabet which is matched on a key of the typewriter keyboard. The operator, of course, sits at the keyboard and as the race progresses and as each car passes the finish point or starting point, the operator depresses a key of the keyboard which carries the same symbol as the car passing the starting point and this operates the machine to effect the operation of the counter assigned to that particular key or identified by the symbol carried by the key and to effect the perforation of a hole in the moving graph paper in the column thereof which has been assigned to the depressed key.

It will be understood, of course, that after the machine is set up for use, it is made ready for operation by starting the vacuum pump or establishing the desired vacuum in the vacuum pipe line 212 and by starting the mechanical mechanism operating motor 53 so that the graph paper will be slowly drawn across the marking board and reeled up on the spool 79.

As illustrated in Fig. 7, the graph paper strip or ribbon is drawn relatively tightly across the rubber surface of the roll 107 and this roll is driven at a desired surface speed, preferably approximately at one eighth of an inch per second.

The take-up spool 79 is also power driven by means of the slip clutch 97 which allows it to rotate faster or at a greater surface speed than the rubber driving roll 107 whereby as the paper is wound up and the surface speed increases the slip clutch compensates for this changing difference in surface speed between the wound up paper roll and the driving roll.

As will be readily apparent from Fig. 12, the friction ring 101 of the clutch 97 engages the flange or end disc 83 of the spool 79 and it is driven faster than the paper engaging feed roll 107, the paper not coming off from the drive roll as fast as the clutch disc is turning or tends to rotate the take-up spool.

The hub or core 81 of the spool is removable so that at the end of the race the entire perforated record can be removed from the machine without unwinding the paper or pulling it off.

The end flange of the spool opposite from the one engaged by the friction clutch, shown in Fig. 12 as the flange 82, is spring loaded so that the spool core may be conveniently removed by forcing the core against the flange 82 so as to shift the stub shaft 86 outwardly against the tension of the spring 89 and thus disengage the key 96 which is carried on the inner side of the spool hub, from one of the notches 95 of the clutch shoulder 94.

In this way the paper carrying the complete record can be removed conveniently.

The machine mechanism is adjusted to move the paper record strip or tape approximately one eighth of an inch per second. In a two hundred, four hundred or five hundred lap race, as each automobile moves past the finish line the number of times that the corresponding typewriter key, that is the key carrying the symbol corresponding to the symbol or indicating means carried by the vehicle, is depressed and this activates the mechanism to operate a counter and a punch actuating bell crank lever to perforate or mark the record sheet in the proper column.

During the course of a race, an announcer can tell immediately which cars are in first and second place by comparing their position on the graph paper and also watching the counters.

To illustrate further the advantages derived from the use of the present machine, a car or vehicle may, for example, be running in the same position as a car in first place but such car may have made two or three stops in the pit. Correct determination of the car which is in first place can be made or verified by reading the graph and noting the counters and if it is a two hundred lap race the counters will, of course, indicate the first car to complete the number of laps, making it the winner. By analyzing the graph after the race the graph record which is unchangeable will indicate the correct driver to receive the prize.

As previously stated the graph paper passes over the backing board at a relatively slow rate, approximately one eighth of an inch per second and approximately twelve to fourteen inches of graph paper may be exposed at one time over the backing board. Where, for example, a period of approximately twenty seconds is required to make a lap, at this approximate rate of movement of the graph paper approximately two and a half inches of paper would be used for each lap and with from twelve to fourteen inches of paper showing on the backing board the record of about three to four laps of the race would be on view at one time.

An announcer or other attendant at the machine can also make pencil notations on the graph paper to designate particular stops, accidents or any other events which may occur with regard to any one of the cars in a race.

It is believed that it will be readily apparent from the foregoing description that upon the depression of any one of the keyboard keys, while the machine is functioning two events take place simultaneously, namely the making of a record mark on the moving tape and the actuation of a counter. Reference to Fig. 7 will show how the action may be traced from the time that the typewriter key oscillated lever 42 is moved to the simultaneous completion of the two operations referred to. When the lever 42 is oscillated, the finger 243 will be pressed down and the pad 240 will be shifted from the air admission passage 239. This will permit the passage of an impulse of atmospheric air through the tube or pipe 235 to an air admission passage 219 of the bleed unit 216, see Fig. 17, and then to an air line 212 to the pouch recess 209 beneath the diaphragm 210 therein, of a secondary valve of the construction shown in Fig. 11. As previously stated, the chamber 205 of the secondary valve is under vacuum and the admission of atmospheric air beneath the diaphragm 210 causes the diaphragm to snap up and elevate the poppet valve so that the top of the latter closes the port 204 and opens the passage 206. A reduction of pressure is then effected in the chamber 203, which is now closed off from the atmosphere, and the reduced pressure or vacuum is set up in the lines 193 and 197 which are coupled with the nipple 200 communicating with the chamber 203 of the secondary valve. The vacuum established in the connected lines 193 and 197 thus effects the collapse of the bellows 182 and 194 connected respectively therewith.

Upon the closing or collapsing of the bellows 182 a downward pull will be applied by the finger 183 to the link wire 184 connected therewith and this will effect the oscillation of the punch pin actuating lever 129 with which the actuated link wire 184 is connected, and the application of a record mark by the punch pin, in this case an aperture, to the record tape in the column thereof which is identified by the same symbol as the symbol carried by the typewriter key which was depressed and which initiated the described action.

The actuation of collapsing of the bellows 194 connected with the line 197 in which the reduced pressure has been effected, causes the swinging of the bellows carried arm 195 which strikes the adjacent finger 178 of a counter 173. This actuated counter also is identified by the same symbol as that which identified the column of the record tape in which the record mark was made.

It will be understood, of course, that this action is repeated or duplicated upon the depression of any one of the typewriter keys which is set up to effect the introduction of atmospheric air into a tube 235.

By the provision of the bleed unit 216, after atmospheric air has been introduced to the underside of the diaphragm 210 of a secondary valve and the line 235 has been closed by the return of the valve pad 240 to its initial position, air is bled off from the underside of the diaphragm of the secondary valve to permit the diaphragm to drop back to the position in which it is shown in Fig. 11. Other means could be provided for bleeding off this air from the underside of each of the diaphragms as by the provision of a small bore bleed hole opening from the atmosphere into the pouch recess below the diaphragm but with the bleed unit the return of the diaphragm to its initial position is made more positive by the provision of the manifold 218 which is connected with the vacuum line 213 as illustrated in Fig. 7.

We claim:

1. As a new combination an apparatus for tallying individual participants in a race comprising, a frame including two spaced side members, means for supporting a roll of tally tape between the members, a tape backing board having two end edges and supported over said means, a slotted guide means extending across between said members at one end edge of said board, said guide means being adapted to have a tally tape run therethrough from a roll, the tape passing over and lying upon the board and being accessible for receiving manual notations, a take-up spool extending across between the side members adjacent to the other end edges of the backing board to take up tape moving from the guide means across the backing board, means for driving the take-up spool to move the tape past the guide means and across said board at a desired constant known linear rate per unit of time, a plurality of tallying elements movably supported by the guide means across the width of a tally tape extending thereacross for movement across said slot and each formed and adapted when moved in one direction to make a tally on the tape, a vacuum system including a tally element actuating bellows operatively coupled with each tally element, means for producing a reduced pressure in the system, a normally closed valve means for and controlling the reduction of pressure in each bellows, and means for effecting the selective opening of each valve means for establishing a reduced pressure in the respective bellows.

2. The invention according to claim 1, with a counter unit positioned adjacent to said guide means and comprising a plurality of individual counters, an actuating means coupled with each individual counter comprising a bellows which when evacuated effects the actuation of its counter, and an air tube connecting each counter bellows with the pressure reduction controlling means for a tally element actuating bellows whereby evacuation of any tally element actuating bellows will be accompanied by a simultaneous evacuation of the respective counter actuating bellows.

3. In combination in a tallying mechanism, a frame including spaced side members, a board member having opposite end edges and supported between the side members and providing a tally tape backing board, means below the board member for rotatably supporting between the side members a roll of tally tape, a tape guide supported across the backing board member adjacent to one end edge of the latter and including a slot directed in a vertical plane across said edge of the board for receiving the tape from the roll, a rotatably supported tape take-up spool across and adjacent to the opposite end edge of the backing board on which the tape is wound, the tape passing from the guide slot to the spool across and on the backing board, mechanism for drawing the tape at a known constant linear rate of speed over the backing board toward the spool, means for rotating the tape take-up spool, a plurality of marker elements carried by the guide member for movement across said slot relative to the tape for registering a tally thereon, and means for effecting the selective movement of said marker elements.

4. The invention according to claim 3, wherein said mechanism for drawing the tape over the backing board embodies a driven friction roller between the backing board and the take-up spool and having the tally tape trained part way therearound and said take-up spool being driven through a slip clutch at a faster speed than the friction rollers.

5. The invention according to claim 3, wherein the means for rotating the take-up spool is so constructed and arranged as to vary the take-up speed of rotation of the spool in proportion to the increase in diameter of the tape roll built up thereon.

6. The invention according to claim 3, wherein said take-up spool rotating means embodies a slip clutch by which the spool speed of rotation is caused to change as the size of the tape roll builds upon the spool.

7. The invention according to claim 3, with a keyboard, the last stated means comprising an impulse plate adapted to be fixed in working position with respect to the keyboard, means for fixing the impulse plate in the said working position, said impulse plate including a plurality of movable fingers, a coupling between each finger and a key of the keyboard by which actuation of the finger is effected upon a prescribed movement of the key, and means controlled by and set in operation upon actuation of a finger for imparting tally registering movement to a marker element.

8. In a tally mechanism, a frame, means for rotatably supporting a roll of tally tape therein, a rotatably supported take-up spool, a tape guide and marker mechanism comprising a bar supported by the frame in spaced parallel relation with the spool, means paralleling the bar forming a guide slot for the passage of a tape from a roll to the spool, a plurality of marker pins supported by the bar for reciprocal movement across the guide slot, an actuating bellows for each marker having a fixed part and a movable part, means for selectively effecting the evacuation and collapse of the marker actuating bellows, and an operative coupling between the movable part of each bellows and marker pin whereby evacuation of a bellows will effect projection of the marking pin coupled thereto across the guide slot and the formation of a tally mark in a tape passing through the slot.

9. The invention according to claim 8, wherein said operative coupling comprises a bell-crank pivotally mounted on the bar, a coupling between one leg of the bell-crank and the marker pin, and an operative coupling between the other leg of the bell-crank and the said movable part of the bellows.

10. In a tally mechanism, a frame, means for rotatably supporting a roll of tally tape within the frame for rotation, a rotatably supported spool in the frame for winding up tape drawn from a roll supported by said means, means for drawing tape from a roll toward the spool, means for driving said spool to wind the tape thereon, power mechanism having driving connection with both the tape drawing means and the spool, the said connection with the spool including a slip-clutch, a marker element supporting bar secured across the frame in parallel relation with the spool, a stripper plate secured in spaced parallel relation with said bar and providing therewith a tape guide slot, said plate having a longitudinal row of stripper apertures therein, said bar having a longitudinal row of pin apertures therethrough and each in line with a plate aperture, a key bar overlying the first bar, a plurality of bell-crank keys pivotally supported on the key bar to swing on a common axis extending longitudinally of the bars, each bell-crank key having a depending leg and a horizontal leg, a punch pin reciprocably supported in each of said pin apertures and having pivotal coupling with a depending key leg, a plurality of collapsible vacuum operated key actuating bellows each operatively coupled with a horizontal leg of a bell-crank key and acting when evacuated to oscillate the key and effect projection of a pin across said slot, and means for selectively effecting evacuation of said bellows.

11. In scoring apparatus of the character set forth, a casing including a bottom, side walls and end walls, a mechanical mechanism, a vacuum mechanism and a counter mechanism in the casing, said mechanical mechanism including a tally sheet tape backing board supported horizontally between and adjacent to the top of the side walls, means for supporting a roll of tally sheet tape in the casing and for moving it at a desired rate over the top of said board, a plurality of actuatable punch pins supported in a row across said board and each functioning upon actuation in one direction to mark a tally on the tally sheet tape, said vacuum mechanism including a bellows unit for and operatively coupled with a pin for actuating the pin when the bellows unit is evacuated, an air conduit connected to each bellows unit, means forming a chamber adapted to have a reduced air pressure maintained therein, a normally closed valve between said chamber and each air tube, said valve including an air inlet separated from the vacuum chamber by a movable diaphragm which moves to open the valve upon the admission of air at atmospheric pressure into the port and a plurality of key actuated normally closed valves each connected with a port and when opened admitting atmospheric air to the port, and said counter mechanism including an individual unit for each marker pin, a bellows unit for each counter unit operatively coupled thereto and when evacuated actuating the unit to register the tally, and an air conduit coupling each of the last named bellows units with the conduit of one of the first named bellows.

12. The invention according to claim 11, wherein said key actuated valves are associated in a single elongate carrier, means for securing said carrier to a typewriter base beneath the typewriter keys, means for operatively coupling each typewriter key to a key actuated valve, and said connection of each key actuated valve to a port comprising an air tube.

13. In a race recording apparatus, in combination with a key controlled impulse valve unit, a manually transportable apparatus comprising in a housing, a table in the top part of the housing, a record tape, means in the housing below the table for rotatably supporting a roll of the tape for unwinding, a rotatable take-up roll upon which the tape is wound and a tape drive roll having its periphery substantially in the plane of the top of the table at one end of the latter, a slotted tape guide unit adjacent to and extending across the opposite end of the table, the tape passing from the roll thereof through the slot of said guide across and upon the top surface of the table to and around the drive roll to the take-up roll, the tape being accessible through a substantial portion of its length upon the top of the table for the making of manual notations thereon, a power drive means operatively coupled to the drive and take-up rolls, a plurality of markers supported by and for reciprocable movement across the slot of said guide unit, a bank of vacuum actuated motors in the housing beneath said guide unit, a plurality of pivoted marker actuating keys each operatively coupled to a marker, a coupling link between each key and a vacuum actuated motor, a bank of secondary vacuum actuated valves in the housing each having a tubular connection with a vacuum actuated motor, means for coupling the last mentioned valves with a vacuum pump, and means by which selective actuation of valves of said key controlled unit will effect through a secondary valve the actuation of a vacuum motor by reduction of air pressure in the latter.

14. The invention according to claim 13, in combination with a bank of digitally operable mechanical counters arranged in an exposed horizontal array in the top of the housing, a vacuum actuated motor beneath and for operating each counter, said counters each being digitally operable independently of the underlying motor, a tubular connection between each counter operating motor and a tubular connection for one of the first mentioned motors, and means by which a counter operating motor will, upon reduction of air pressure therein, operate its respective counter.

(References on following page)

References Cited in the file of this patent

UNITED STATES PATENTS

| | | |
|---|---|---|
| 755,224 | Gell | Mar. 22, 1904 |
| 1,067,047 | Marchthal | July 8, 1913 |
| 1,131,104 | Avram | Mar. 9, 1915 |
| 1,259,906 | Richards | Mar. 19, 1918 |
| 1,266,292 | McCormick | May 14, 1918 |
| 1,329,886 | Catron | Feb. 3, 1920 |
| 1,383,757 | Reynolds | July 5, 1921 |
| 1,523,689 | Hole | Jan. 20, 1925 |
| 1,794,685 | Hayman et al. | Mar. 3, 1931 |
| 2,131,346 | Fairchild | Sept. 27, 1938 |
| 2,148,188 | Chappell et al. | Feb. 21, 1939 |
| 2,237,767 | Schott | Apr. 8, 1941 |
| 2,258,364 | Maxwell | Oct. 7, 1941 |
| 2,641,521 | Brandon | June 9, 1953 |
| 2,690,951 | Moore | Oct. 5, 1954 |
| 2,719,293 | Hornbruch et al. | Sept. 27, 1955 |